(12) United States Patent
Grossman et al.

(10) Patent No.: US 7,461,242 B2
(45) Date of Patent: Dec. 2, 2008

(54) METHOD AND APPARATUS FOR PROVIDING CONTEXT SWITCHING OF LOGIC IN AN INTEGRATED CIRCUIT USING TEST SCAN CIRCUITRY

(75) Inventors: Mark S. Grossman, Palo Alto, CA (US); Gregory C. Buchner, Los Altos, CA (US)

(73) Assignee: ATI Technologies ULC, Markham, Ontario (CA)

( * ) Notice: Subject to any disclaimer, the term of this patent is extended or adjusted under 35 U.S.C. 154(b) by 24 days.

(21) Appl. No.: 11/163,921

(22) Filed: Nov. 3, 2005

(65) Prior Publication Data

US 2007/0101108 A1    May 3, 2007

(51) Int. Cl.
*G06F 9/48* (2006.01)
(52) U.S. Cl. .......................................... 712/228; 714/30
(58) Field of Classification Search .................. 714/764, 714/30; 341/65, 55, 67, 51, 50, 60, 61, 87; 712/228
See application file for complete search history.

(56) References Cited

U.S. PATENT DOCUMENTS

| 4,535,455 A | * | 8/1985 | Peterson | 714/6 |
| 4,988,998 A | * | 1/1991 | O'Brien | 341/55 |
| 2002/0087928 A1 | * | 7/2002 | Six | 714/726 |

OTHER PUBLICATIONS

Medvedev, Alexander; Longhorn Microsoft improves graphics by 55%; from www.digit-life.com; Jun. 7, 2005; pp. 1-9.

* cited by examiner

*Primary Examiner*—Richard Ellis
(74) *Attorney, Agent, or Firm*—Vedder Price P.C.

(57) ABSTRACT

A method and apparatus provides context switching of logic in an integrated circuit using one or more test scan circuits that use test data during a test mode of operation of the integrated circuit to store and/or restore non-test data during normal operation of the integrated circuit. The integrated circuit includes context control logic operative to control the test scan circuit to at least one of: store and restore context state information contained in functional storage elements in response to detection of a request for a change in context during normal operation of the integrated circuit.

23 Claims, 9 Drawing Sheets

METHOD AND APPARATUS FOR PROVIDING CONTEXT SWITCHING OF LOGIC IN AN INTEGRATED CIRCUIT USING TEST SCAN CIRCUITRY

FIELD OF THE INVENTION

The invention relates generally to maintaining data and state information, or other suitable information, when switching circuitry for use from one context to another.

BACKGROUND OF THE INVENTION

Proposed operating systems will require the fast switching of logic circuits, such as subsystems within graphics processing hardware, or any other logic circuits that are used for differing functions or operations. However, switching the use of logic circuits from one function to another can result in the loss of data in portions of hardware pipelines or other logic.

A context switch occurs, for example, when one application or process is switched to use the same hardware that another application was using. Proposed operating systems may wish to frequently switch contexts such as rapidly switching between applications to draw new windows where the switching may require less time than it takes to properly flush an entire 3D pipeline. Proposed operating systems may send to a graphics processing circuit, for example, a list of different applications and hence different contexts to run in sequence which may require the use of a 3D graphics pipeline every few milliseconds for different contexts. As a result, the 3D graphics pipeline would have to draw window borders on a much more frequent basis than is currently done. Also, page faults for hardware using virtual memory can occur during a context switch. This will require time to supply missing memory data, during which time another application could otherwise be using the hardware. Different applications may use different page tables for each context so it is desirable to also store other state information such as the pointers to page tables as well as other information. Other problems related to context switches can occur if the requisite state information is not kept (such as keeping the state information of the programmed registers that are used by a 3D graphics pipeline to render objects or other information).

One technique for switching from one context to another is to flush all pending data out of a hardware pipeline prior to switching the logic for use with a new context. However, this can take large amounts of time. Other proposals known to the inventors include letting data pass through certain sections of a pipeline and adding additional buses and functional pathways to flush any pending work and associated state information and later feeding this data and state information into the front of the pipeline. However, this can be complicated to carry out and potentially costly.

A suggested technique for maintaining information in response to a context switch has been proposed that requires flushing the pipeline at certain stages that allow some stage of the pipeline to be completed (but not the entire pipeline) but this can result in partially rendered triangles since the pipeline may not have completed processing of the pixel through the entire pipeline. With such a proposal, the processing hardware can pick up where it left off but it can require additional logic in a scan converter to avoid re-rendering of pixels that were already rendered. If pixels are being blended it is also desirable not to repeat the blending. Consequently, it is desirable to keep track of where the pixel rendering is at a particular point in a pipeline.

There is also a kind of context switching that replicates state bits N times, where N is the number of potentially runnable contexts, but this can cost too much in extra hardware resources where either N or the number of bits is large. There are also interrupt-based software-driven save and restore techniques that use host processors, for example, to save state information and data and then restore the state information and data back into a portion of a pipeline or logic circuit. However, this can have high latency and can unnecessarily burden the host processor and reduce its processing bandwidth.

Accordingly, a need exists for a method and apparatus that can, among other things, facilitate context switching of logic circuits.

BRIEF DESCRIPTION OF THE DRAWINGS

The invention will be more readily understood in view of the following description when accompanied by the below figures and wherein like reference numerals represent like elements.

DETAILED DESCRIPTION OF THE PREFERRED EMBODIMENT

Figure 1:
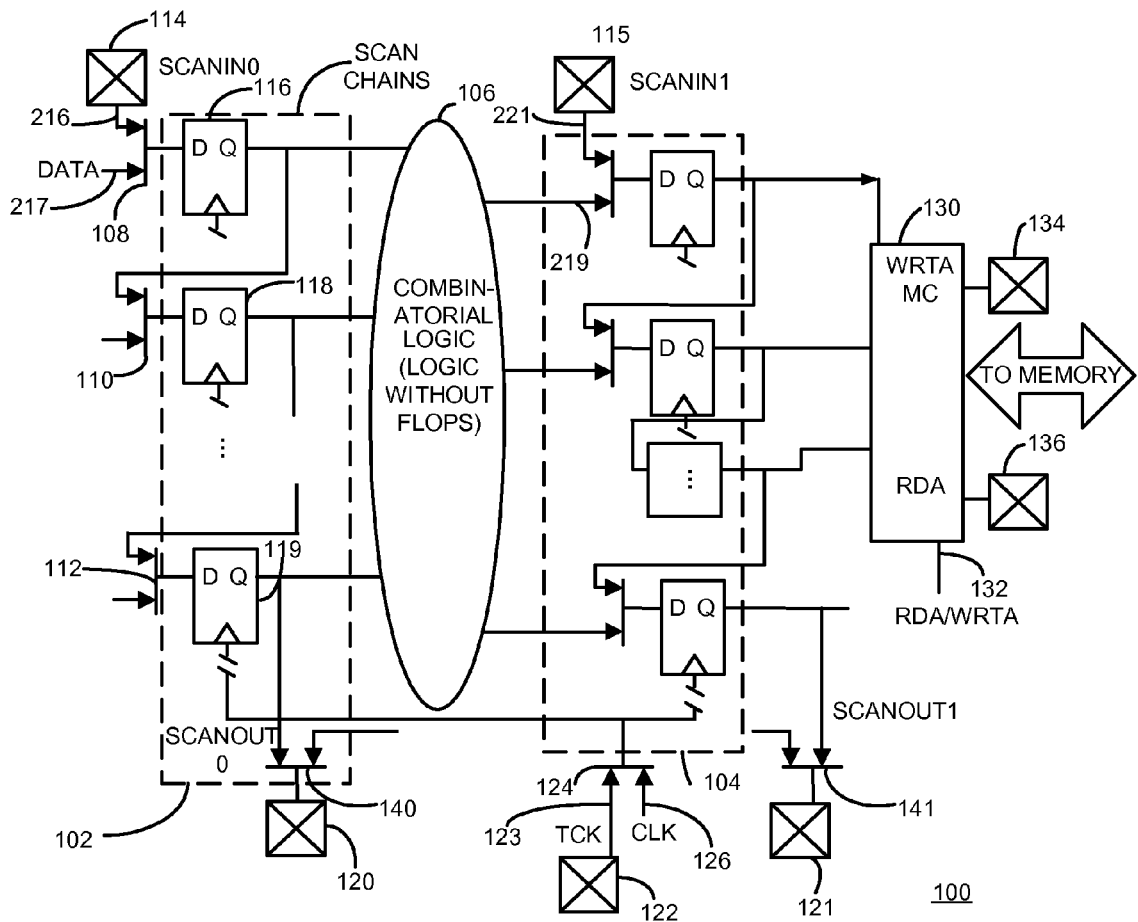
FIG. 1 is a block diagram illustrating one example of a portion of an integrated circuit for example that employs a conventional structure of test scan chains used as test scan circuit.

Briefly, a method and apparatus for providing context switching of logic in an integrated circuit includes one or more test scan circuits that use test data during a test mode of operation of the integrated circuit and are used to store and/or restore non-test data during normal operation of the integrated circuit. The integrated circuit includes context control logic operative to control the test scan circuit to store and/or restore context state information, such as that contained in functional storage elements. Context switching may be done in response to detection of a request for a change in context during normal operation of the integrated circuit. As such, in one embodiment, a method for storing context state information during a non-test mode of operation of the integrated circuit utilizes context switching memory clients operating in real time. Test scan logic normally used only during a test mode of operation, is used during non-test modes of operation to either store context state information of a logic circuit or restore state information back into the logic circuit once the context changes back. If the logic circuit is coupled to primary processing shift registers that store data during normal operation, the test scan circuit is used instead of such primary processing shift registers to store and/or restore context information for the logic during normal operation. In one embodiment, the integrated circuit may effectively simultaneously store the context information associated with a first context and restore context information associated with a second context.

In one embodiment, an integrated circuit includes test scan logic such as one or more built in self test (BIST) scan circuits that are operative during a test mode of the integrated circuit to test a portion of the integrated circuit. Context control logic is operative to control the built in self test scan circuit of the integrated circuit during a non test mode to store and/or restore context state information of the test scan circuit to facilitate context switching during normal operation. A method for providing context switching in an integrated circuit includes controlling at least one built in self test scan circuit to store context state information and/or restore context state information during a non-self test mode of operation of the integrated circuit and store context state information in memory and/or retrieve stored context information from memory to restore context state information for the integrated circuit in response to the controlling of the built in self test circuit.

In another embodiment, a random access memory (RAM) array also includes test scan circuitry that is used to test the RAM array during a test mode. The integrated circuit also includes context control logic that is operatively coupled to the RAM array and operative to control the test scan circuitry of the RAM to store or restore context information from and to the RAM array in response to the detection of a change in context during non-test operation of the RAM array. If RAM test scan circuitry already present is missing or insufficient in functionality or speed, it is understood that additional circuitry dedicated to context switching may be added.

In another embodiment, a method and apparatus is disclosed that serially shifts in new state information and/or shifts out current state information using a test circuit, during a normal mode of operation and simultaneously reads new state information and/or writes current state information to the memory. The method and apparatus also inhibits the serial shifting depending on the availability of both memory read and write capability of the memory into which the context state information is stored (or retrieved).

Although not considered applicable to normal operation of an integrated circuit or to switching, it is also known to facilitate on-chip testing of integrated circuits, for example, to include on IC scan chains that connect together latches at various portions within a logic circuit. The latches are controlled to pass test data during only a test mode through the circuit, pipeline, or portion of a pipeline or other circuit to test the operation of the circuit. Integrated circuits may also include built-in memory self-test circuits having extra serially-connected latches and multiplexing paths attached to random-access memories (RAMs) on the integrated circuit to read and write test patterns. These self test scan chains are used for debugging purposes during the test mode of the device. As such, a built in self test scan circuit (BIST) is used in many integrated circuits including random access memory (RAM), graphics processing circuitry and numerous other types of logic circuits. However, the scan chains for testing are typically not utilized during normal operation.

FIG. 1 illustrates one example of known built in self test scan chains on a portion 100 of an application specific integrated circuit (ASIC). The built in self test scan chains 102 and 104 include storage elements, shown here as D flip-flop stages 116, 118, 119 etc., that hold machine control and data states, with combinatorial logic 106 between scan stages. The built in self test scan chains 102 and 104 may provide input test data to and receive output data from combinatorial logic stages 106. The built in self test scan chains 102 and 104 are formed by serially connecting the inputs and outputs of the storage elements. For purposes of brevity, discussion will be made with respect to scan chain 102, however it will be recognized that the discussion also applies to other scan chains such as scan chain 104. Multiplexers 108, 110, 112 are selectively controlled so that during a test mode of operation of the ASIC, test input data 216 is input via a scanin0 test pad 114 to a first storage element 116 and the output of storage element 116 then serves as the input to intermediate storage element 118 and so on. The test sequence is scanned out of the scanout0 output pad 120 from the last or output storage element 119 in order to test, for example, the flip flop stages and combinatorial logic 106. Multiplexers 140 and 141 allow output pads 120 and 121 to be shared between functional behavior and test scan behavior.

During normal operation, multiplexers 108-112 are controlled so that the normal functional data input into each of the respective multiplexers provides the data to the flip flops 116-119. A similar operation is carried out for the second scan chain 104 so that the combinatorial logic 106 supplies the data input into the flip flops making up scan chain 104. Also output pads 102 and 121 (e.g. or pins) of the integrated circuit are supplied their normal output data. A test clock signal 123 is input on test clock pad 122 through a multiplexer 124 to control clocking of the storage elements 116, 118, 119 etc. during the test operation, as known in the art. A functional clock signal 126 is input to the multiplexer 124 during normal operation to suitably clock the storage elements 116, 118 and 119 during normal operation. A memory controller 130 may be used during normal operation to either read data (e.g. via port rdA) or to write data (e.g. via port wrtA) from memory for use by the combinatorial logic 106. In this example, data is written to the memory controller 130 by read/write control line 132 and input/output pads 134 and 136 provide access to memory outside the integrated circuit.

As such, all storage elements 116, 118, 119 etc. are stitched into test scan chains via a multiplexer at every input. Input/output pads (pins) are shared between functional and test scan operations through another set of multiplexers. The clock to all storage elements is multiplexed using the clock signal 126 to select the clock source used during functional mode (i.e., normal mode) and test clock during test mode. The memory controller 130 may be present, for example, for storage of information during the functional mode. For test mode, random access memory (RAM) functional sections are also known to employ serial chains to convey test addressing, data, and test result information to a test controller that may reside on the ASIC or external to the device.

Other known testing circuits replace the direct connection of the scan in/scan out lines to input/output pins with connections to vector compression and decompression blocks that then connect to the I/O pin or pads. However, as noted above, ultimately these scan chains are selected to receive or output data during a test mode to the scan out pins.

Figure 2:
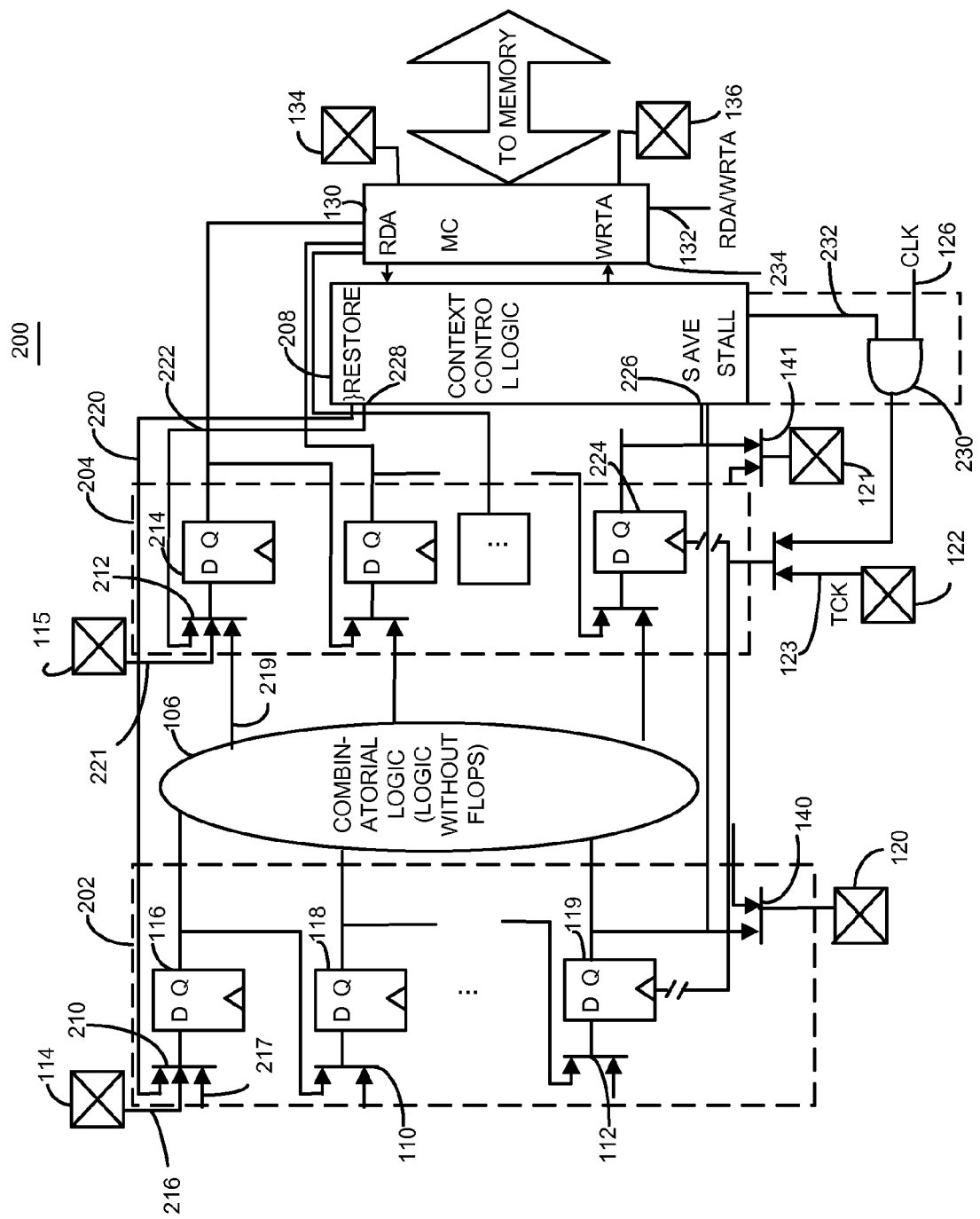
FIG. 2 is a block diagram illustrating one example of the apparatus for providing context switching of logic in an integrated circuit in accordance with one embodiment of the invention.

FIG. 2 illustrates one example of an integrated circuit 200 such as a graphics processor, microprocessor, DSP, or any other suitable integrated circuit. In this example, the integrated circuit 200 includes a plurality of test scan circuits 202 and 204 that are similar to those shown, for example, in FIG. 1 except they include additional logic. The test scan circuits 202 and 204 are operative to use test data during a test mode as previously described, but are also operatively configured and controlled to use non-test data during normal mode of operation of the integrated circuit 200. In this example, each test scan circuit 202 and 204 includes a scan chain and each scan chain includes latch elements 116, 118, 119 as previously described (i.e., flip flops are coupled to form a test scan chain). If the combinatorial circuit 106 is coupled to primary processing shift registers that store data during normal operation, the test scan circuits 202 and 204 are used instead of such primary processing shift registers to store and/or restore context information for the combinatorial logic 106.

The integrated circuit 200 also includes context control logic 208 that is operatively coupled to the scan test circuit 202 and 204 and is operative to control the test scan circuit 202 or 204 to store and/or restore context state information via the scan test circuit in response to detection of a request for a change in context during normal operation (e.g. during a non-test mode) of the integrated circuit 200. Detection of a request for a change in context may be, for example, through an application populating a register (not shown) that is accessed by the context control logic 208 to determine when a context state store or restore condition occurs. Any other suitable technique may also be used to detect the request for a change in context. The context state information may be data stored in the flip flops or data stored in RAM elements, for example.

In this example, the context control logic 208 is operative to select inputs to each of the plurality of scan chains to facilitate restoration of context state information from memory (not shown) during normal operation. In this example, the context control logic 208 is operatively coupled to switching structures 210 and 212 of each scan chain, shown as a multiplexer. The switching structures 210 and 212 are operatively coupled to an input latch element 116 and 214, respectively of a scan chain 202 and 204. The switching structures 210 and 212 are controllable to select as input to each input latch element 116 and 214, at least one of input data 21 7 and 219 from a logic circuit 106 (or other logic circuit not shown), test data 216 and 221 from, for example, external pads 114 and 115, and the restore context state information 220 and 222 that is stored in memory (not shown) via restore data lines.

At the end of each scan chain is shown an output latch element 119 and 224 that has an output coupled to the context control logic 208 to provide context state information for storage in the memory in response to a context state change so that the test scan chains can be used to save data during context changes. As such, the context control logic 208 includes a save port 226 as well as a restore port 228.

The context control logic 208 also includes clock switching logic 230, in this example an AND gate, wherein the context control logic 208 is operative to control the clocking of circuits 202 and 204 in order to save and/or restore context state information to and from memory (not shown). Hence, the context control logic 208 may generate a stall signal 232 to stall clocking to the respective storage elements 116-224 to facilitate the saving and storing of context information through the test scan chains.

The integrated circuit 200 also includes memory control logic 234 which is operatively coupled to the context control logic 208 and provides parallel store and retrieve operations for another memory client (not shown) as well as the save and restore of context state information via the context control logic 208 through the test scan chains. As such, the context control logic 208 has a port to the memory controller as though it is a memory client.

In this example, the combinatorial logic circuits 106 are logic circuits in a three dimensional graphics engine, however any suitable logic may be used. The memory control logic 234 is a memory controller that, while performing normal functional read and write operations for parts of the integrated circuit that are not context switching, is simultaneously (via suitable arbitration mechanisms) operative to facilitate storage and/or retrieval of context state information to and from either on-chip memory of the integrated circuit or off-chip memory from the integrated circuit that may be, for example, system memory in a system or subsystem. In addition, the combinatorial logic 106 may also be any other logic in any other memory clients as desired.

Figure 3:
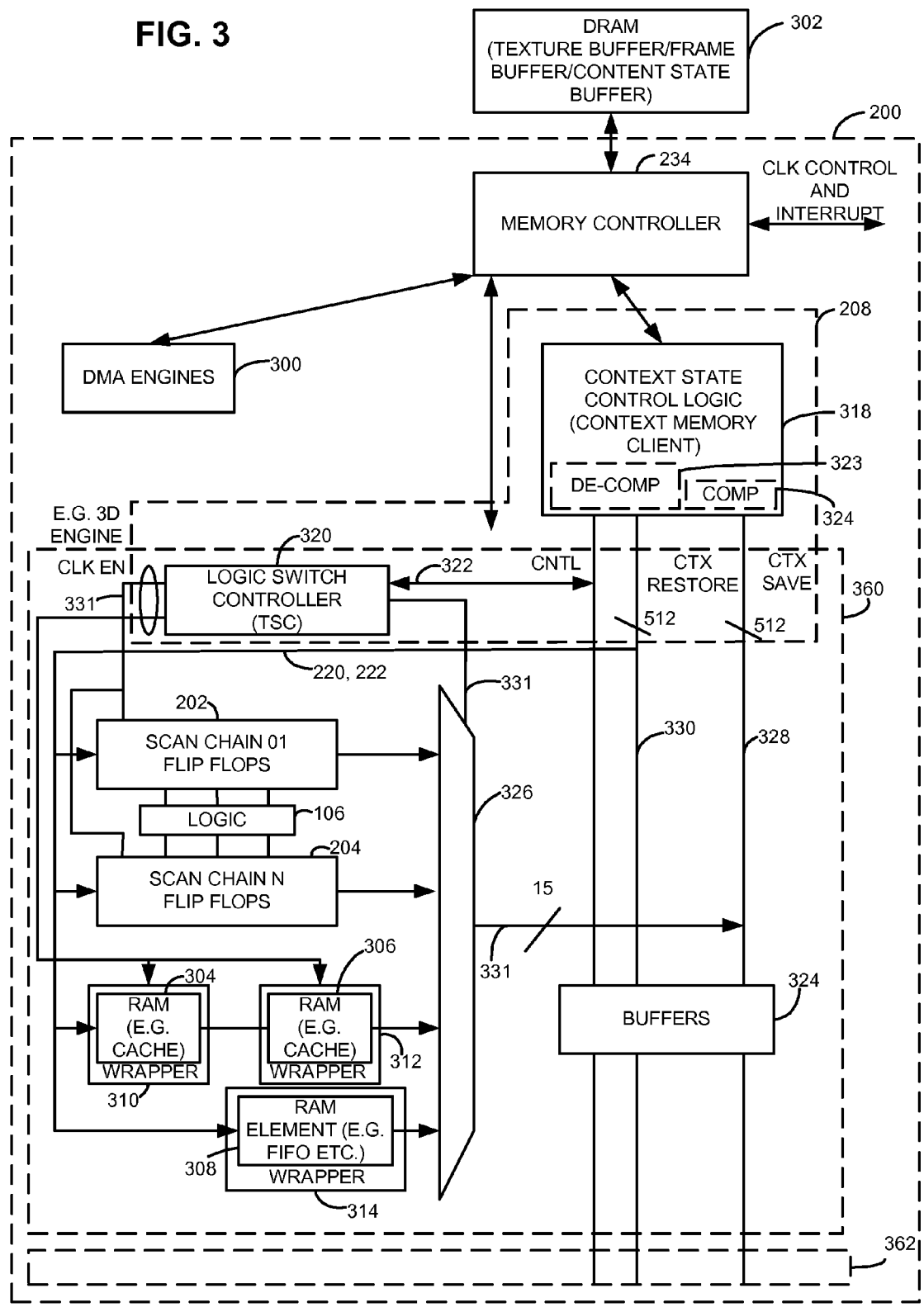
FIG. 3 is a block diagram illustrating one example of a circuit employing test scan circuits, such as scan chains, and context control logic in accordance with one embodiment of the invention.

FIG. 3 illustrates in more detail one example of an integrated circuit 200 that includes other memory clients coupled to the memory controller 234 such as direct memory access engines 300. As shown, the memory controller 234 stores and retrieves information from memory 302 including data during normal operation as well as context state information during or in response to context change conditions. Examples of context state information may include, for example, state information relating to graphics processing pipelines, video processing pipelines, and associated virtual addresses for a particular memory client, or any other suitable information. In this example, the integrated circuit 200 includes differing types of test scan circuits and in this example, includes scan chains (e.g. flip flop scan chains) as well as RAM arrays 304, 306 and 308 which may include self test wrappers 310, 312 and 314, respectively, that are also used to store and restore context information stored in the RAM arrays in response to a change in context.

In this example, the context control logic 208 includes context state control logic 318 and a logic switch controller 320. The context state control logic 208 may generate suitable control data 322 to control the logic switch controller 320 as well as any buffers 324 that may be necessary, for example, to buffer context state information that is bursty in nature. The context state control logic 318 optionally includes decompression logic 323 and compression logic 324 to, for example, compress context state information that is saved to memory 302 and to decompress compressed context state information through the decompression logic 323 that is retrieved from memory 302 during a context restore operation. As shown in this example, there is logically one 512 bit read/write client interfaced to one memory channel, however any suitable bus or path configuration may be used. The logic switch controller 320 controls flow on the restore bus 330, generates control signals 331 in the form of clock enable signals ("CNTL") as well as other control signals to the various scan chains, RAM array elements and multiplexing circuit 326 to facilitate context restore and context save operations as indicated by the context state control logic 318. Outputs of each of the scan chains 202, 204 and RAM elements 306 and 308 serve as inputs to a multiplexing circuit 326 which is controlled by the logic switch controller 320 to output the requisite saved context information onto the context save bus 328 when a context save condition occurs for given logic. As such, the multiplexing circuits 326 includes an output 331 that is coupled to the context save bus 328. Similarly, the context restore bus 330 is used to provide data retrieved from memory 302 as restored back into the scan chains or RAM arrays when the integrated circuit needs to switch back or revert to a previous context state. Hence, the logic switch controller 320 issues control signals to the RAM wrappers and flop scan logic and handles flow control during the save/restore process as needed. The process is started in response to a control signal from a corresponding context state control logic 318 which stops the process for each of the various scan chains based on the length of a scan chain, as the scan chains can have differing lengths. If desired, there may be context control logic for each memory client or individual or groups of test logic depending upon the desired operation.

For example, an application specific integrated circuit may be partitioned for ease of physical layout into multiple tiles or groupings of subsets of logic generally shown as 360 and 362. Thus, each grouping may have, for example, a unique set of flip flop scan chains and each grouping may have a unique set of RAM arrays such as registers or buffers with context data save and context data restore ports coupled to the context save and context restore buses 328 and 330. Each grouping utilizes as many of the context save and restore bus signals as it needs according to the relative number of state bits it contains. Each grouping may have its own logic switch controller 320 and all scan chains across multiple groupings can operate in parallel. It will also be recognized that although a memory controller 234 is shown, that this can represent, for example, a plurality of memory controllers. Each grouping 360 and 362 may be coupled to a given memory controller. The context state control logic 318 may provide data on its share of the context restore bus by, for example, reading a word from a restore area in memory using its associated memory controller. The context state control logic 318 may interleave the reads and writes and provides context data FIFO buffering via buffers 324 as necessary to allow attached scan chains to clock and simultaneously input new restore data on the context restore bus and dispose of context save data on context save bus. When context state control logic 318 cannot do both save and restore on a given clock, such as due to insufficient or interrupted access to memory, the context state control logic 318 signals the logic switch controller 320 of this event (such as a stall event) and the logic switch controller 320 may then stall, through the clock enable data 331, clock signals for the given scan chains or other test logic.

In addition if desired, the logic switch controller 320 may also keep track of a count of successful shift cycles for its group and when this count equals a length of the scan chains, it may permanently disable the clock and informs the context state control logic 318 that it is done with its save/restore operation. When the context state control logic 318 sees that all logic switch controllers for all the groups have reported that they are done, the context state control logic 318 stops its save/restore operation. It will be recognized that multiple context state control logic and multiple memory controllers can operate independently and asynchronously, with different scan chain lengths for each.

Also, the scan chains 202 and 204 are configured as parallel scan chains that may contribute, for example, to a single pair of context save and context restore bits. In one example, the chains may clock once every four clocks while a small amount of multiplexing and demultiplexing may occur at full clock rate to provide a full rate bit stream (see e.g. FIG. 9). This is because the use of flip flop scan chains at full design speed may cause a much higher logic activity rate than normal operation causing stress placed on power delivery. To avoid having to incur the cost of increase in the power and heat capacity of the integrated circuit, multiple parallel scan chains, such as noted above, may be used to contribute to a single pair of the context save and context restore bits on the respective buses.

In addition, the disclosed logic allows simultaneous save and restore operations on one hand and functional operations on the other so that the integrated circuit may save and restore only graphics related states while the rest of the integrated circuit continues to operate. For example, a display controller may continue to refresh a display screen by reading pixels from the frame buffer area of memory while save and restore context state information is being communicated to the memory. In addition, the logic issues control signals to block the interfaces between the scanned and non-scanned logic, otherwise there may be random interface interference. For example, the context state control logic 318 may generate suitable control signals to block the interfaces for memory between scanned and non-scanned logic in the integrated circuit.

As also shown in FIG. 3, a plurality of serially coupled RAM elements 304 and 306 have associated test scan circuits in the form of context scan and BIST wrappers (see also FIGS. 7 and 8) and the context state control logic 318 is operative to shift context information from one RAM element 304 to another RAM element 306 during normal operation and to multiplex saved context data in the data path to a memory controller during a context save operation.

Also in operation, the integrated circuit may execute a first context and the context state control logic 318 may then suspend execution of the first context and store a first set of information from the first context to memory using a test circuit such as the test scan chain or chains. The integrated circuit also executes a second context in response, for example, to a detection that a context change has occurred and suspends execution of the second context. The context state control logic 318 loads the first set of context information from memory to restore the data in the test circuit and continues execution of the first context. This is performed during the normal operation of the integrated circuit. When the integrated circuit is in a test mode, the test circuit is used for testing purposes as known in the art. The testing may include, for example, debugging of the integrated circuit as known in the art.

The memory as noted may be main memory attached to a central processing unit or may be memory coupled to the integrated circuit either on-board or off-chip. Also, the context state information, as noted above, may be state information from flip flops or from a random access memory array and as such, may be a memory state. In addition to the methods above, the method may include, for example, after storing a set of initialization information from a first context to memory using a test circuit, later restoring the initial state of the integrated circuit.

The method in another embodiment may include serially shifting, such as in the case of the RAM array element, new information and/or shifting out current information using a test circuit and simultaneously reading new context state information and/or writing current context state information to memory and inhibiting the shifting of context state information depending on the availability of both a memory read and write capability by a memory controller.

Figure 4:
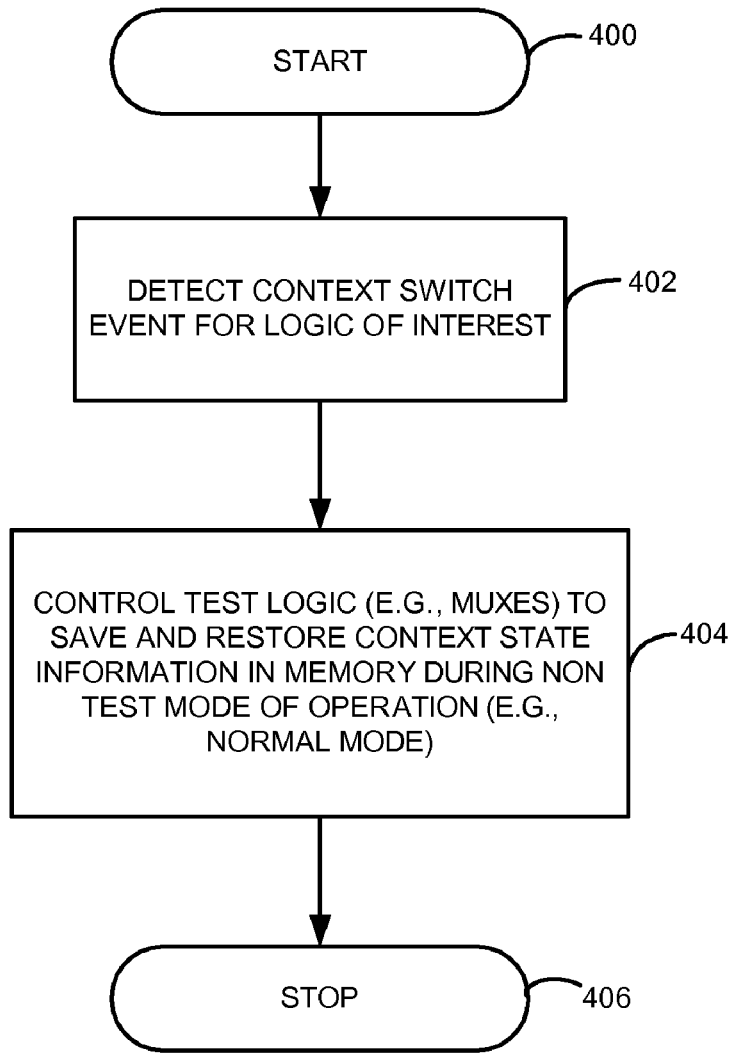
FIG. 4 is a flowchart illustrating one example of a method for providing context switching of logic in an integrated circuit in accordance with one embodiment of the invention.

FIG. 4 illustrates one example of a method for providing context switching of logic state in an integrated circuit which begins in block 400. As shown in block 402, the method includes detecting a request for a change in context for at least one of a plurality of logic circuits in the integrated circuit. For example, the context control logic 208 may detect a request for a change in context through any suitable technique, and in one example, through an interrupt or a register read process. An example of a logic circuit of interest may be, for example, a three dimensional rendering engine in a graphics processor or any other suitable logic. As shown in block 404, the method includes controlling at least one test scan circuit to at least save or restore context state information of the logic circuit(s) in response to the request for a change in context. In one example, the method may include, for example, controlling built in self test logic to save and/or restore context state information such as functional state information for given logic, and memory during a non-test mode of operation such as in a normal mode of operation of the integrated circuit. This may be done, for example, by controlling the multiplexers 212 and 210 or any other suitable logic to, for example, restore context state information or control the clock signaling to save context state information as necessary using the test circuitry, during normal operation of the integrated circuit.

Referring back to FIG. 3, for example, the method may include, for example, controlling one or more test scan circuits by selecting at least one flop scan chain 202 to output context state information to the context save bus 328 for transfer to memory for storage or to receive stored context state information from memory via the context restore bus 330. As also noted previously, the method may include compressing the context state information prior to storing the context state information in memory and decompressing compressed context state information prior to restoring the context state information. Also, as noted previously, controlling the test scan circuit may include controlling switching logic such as the multiplexers 210 and 212 that are operatively coupled to the logic circuits 108 to store and restore context state information in logic circuits 106.

The method may also include, for example, saving a first set of context state information simultaneously with restoring a second set of context information so that a type of simultaneous save and restore operation can take place via, for example, the context control logic so that differing logic circuits may be controlled to save their relevant state information while a 208 different logic circuit may be restoring its state information depending upon the context change requirements of the system. Also as shown, the plurality of RAM elements 304, 306, 308 that each have associated test scan circuits are controlled by the context control logic 208 to shift context information from one RAM element during one set of clock cycles and from another RAM element during another set of clock cycles, if desired.

The method may also include stalling the save and/or restore operation of the context state information in response to a memory controller 234 loading level so that, for example, the context control logic 208 may generate the stall signal 232 when the memory controller 234 cannot service the memory requests submitted by the context control logic 208. The context control logic 208 may also include suitable context write and context read FIFO buffers to facilitate a bursty storage or saves or restores that may occur.

Stated another way, the circuit of FIGS. 2 and 3, may for example, provide context switching of memory clients in an integrated circuit by providing real time state management of state information for logic circuits and also provide virtual address maintenance for particular memory clients by controlling built in test scan circuits for memory elements to store their virtual to physical address mapping information during a non-test mode of operation of the integrated circuit. As such, the context state information may be, for example, state data as well as virtual address information for a given memory client which information data may be stored in the memory 302 or any other suitable memory. As such, built in test scan circuits normally used during the test mode to self test an integrated circuit are used during normal operation to manage the saving and restoring of context information for logic that is used in response to context switching due to, for example, different software applications requiring different logic functions at different points in time. As shown in block 406, the method may end by waiting for another context change.

Figure 5:
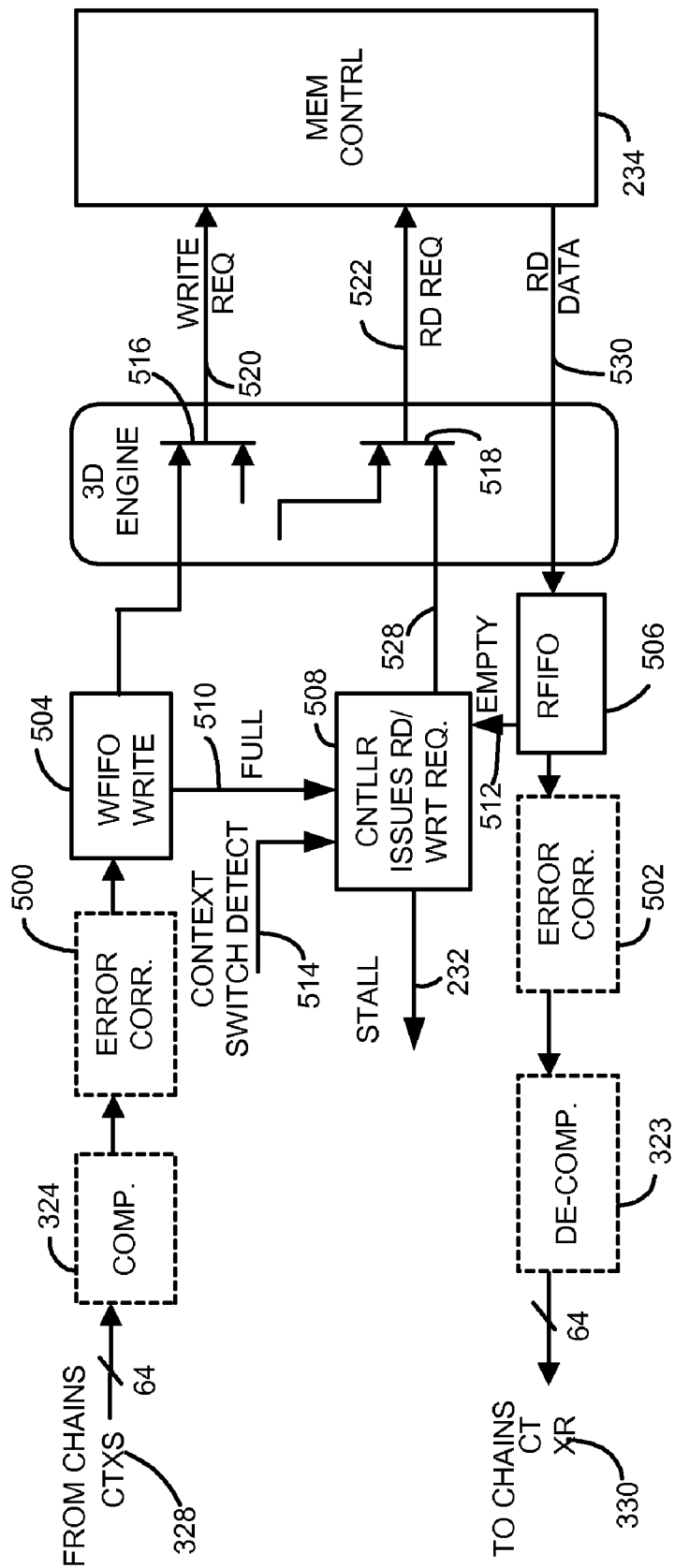
FIG. 5 is a block diagram illustrating one example of context control logic in connection with a 3D graphics engine.

FIG. 5 is a functional block diagram illustrating one example of context control logic in connection with a 3D graphics engine. As shown, the context control logic 208 may optionally include the compression and decompression circuits 324 and 322, respectively, as well as error correction logic 500 and 502 on each of the context save paths and context restore paths in the event that switching states occurs frequently. Error detection and correction may be useful in such instances. The context control logic 208 also includes, in this example, a context write FIFO 504, a context read FIFO 506 and control logic 508. The control logic 508 is operative to determine whether the context write FIFO is full 510 during context save operations and if the context read FIFO is empty 512 and is also responsive to the context switch detect data 514 which, as noted previously, may come from an application writing to a register or from any other suitable source. As shown, multiplexers 516 and 518 may be used optionally to allow a client, such as a 3D engine, to also send write requests 520 or read requests 522 to the memory controller 534 in addition to the controller logic 508 which may also issue, for example, context state read and write requests through the write FIFO 504 in the case of a write request or may issue a read request to restore data through a read request 528. In response to the read request, restore data 530 is provided by the memory controller 534 and decompressed, if necessary, and passed to the context restore bus 330. The controller logic 508 issues a stall signal 232 when, for example, the write FIFO is detected to be full.

Figure 6:
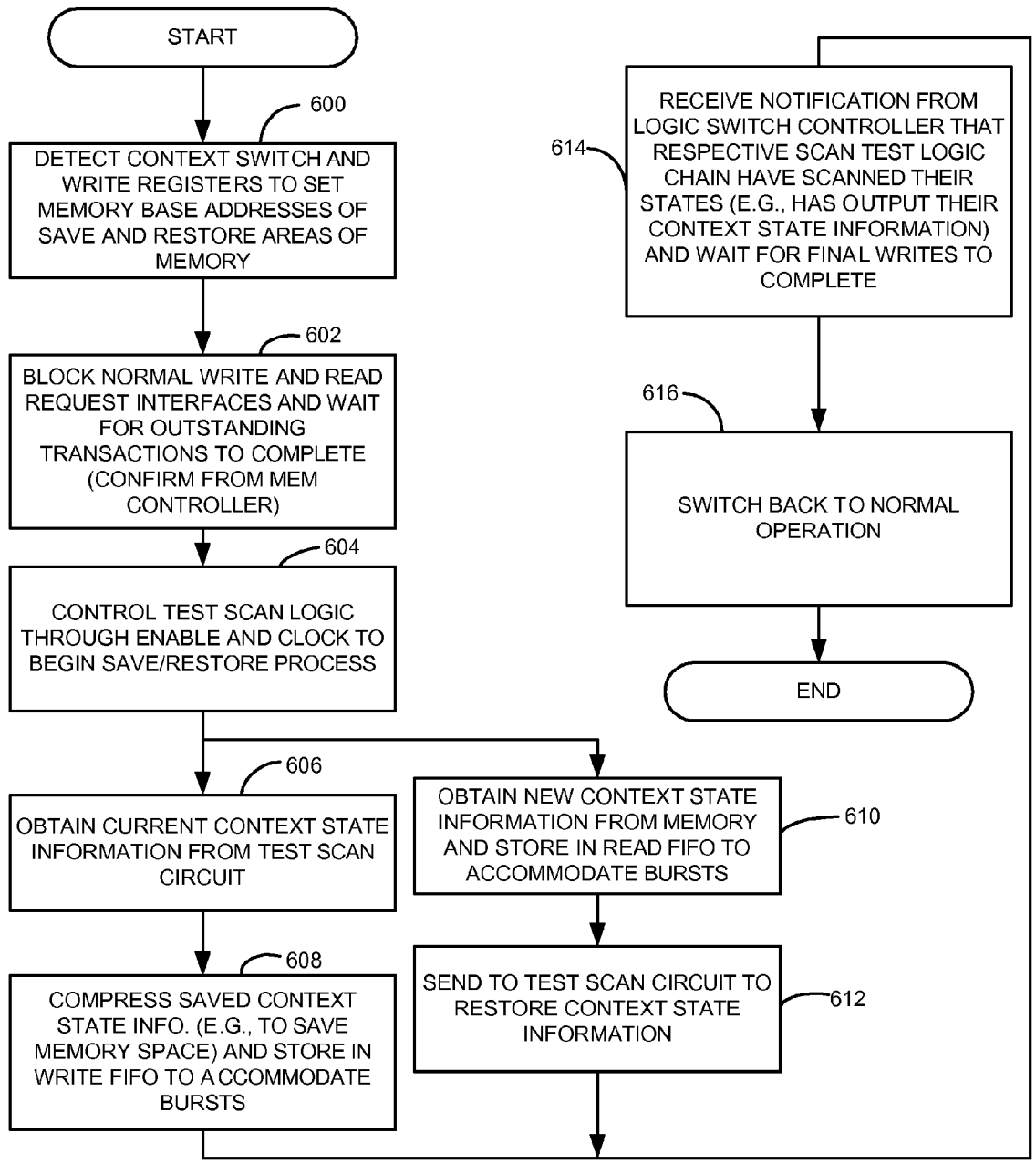
FIG. 6 is a flowchart illustrating one example of a method for providing context switching with respect to FIG. 5.

Referring also to FIG. 6, a method for providing context switching in an integrated circuit is shown that may be carried by the context control logic 208, or any other suitable structure. As shown in block 600, the method includes detecting the context switch and writing registers to set memory base addresses of the save and restore areas of memory. The registers (not shown) are accessible by the controller logic 508. As shown in block 602, the method may include blocking normal write and read request interfaces of a given memory client and waiting for outstanding transactions of the memory client to complete. The completion of current operations may be confirmed, for example, through the memory controller 234 when write or read requests are no longer being submitted to the memory controller by the logic of interest. As shown in block 604, the method includes controlling the test scan logic through enable and clock signals (see FIG. 3) to begin the context state save and/or restore process.

Parallel operations may then take place. For example, in block 606, the method includes obtaining context state information from a test scan circuit in the case of a context save operation and as shown in block 608, compressing the save context state information and storing the saved context state information in the write FIFO 504 to accommodate write bursts. If desired, in parallel, the method may include, as shown in block 610, obtaining new context state information from memory for restoring in the scan chains or RAM wrappers, and storing the read FIFO 506 information to accommodate bursts if necessary. As shown in block 612, the method may also include sending the read data for restoring to the test scan circuits to restore the context state information for the appropriate logic.

As shown in block 614, the method includes receiving notification from the logic switch controller 320, for example, based on a time out, that a respective scan test logic chain has scanned their states (for example, have output their context state information) and wait for final writes to be completed. As shown in block 616, the method may include switching back to normal operation by controlling the clock enable and clock signals through logic 230.

Figure 7:
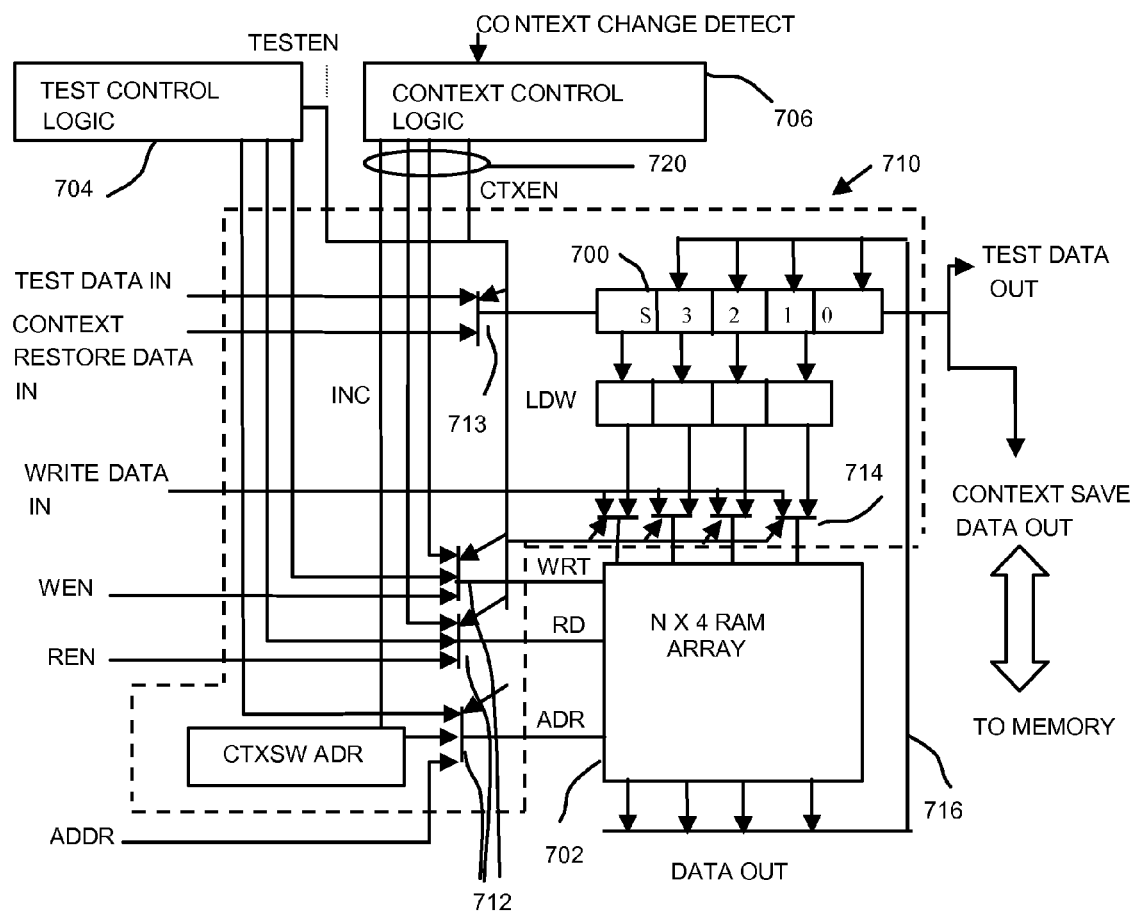
FIG. 7 is a block diagram illustrating one example of context switching structure applied to random access memory element in accordance with one embodiment of the invention.

FIG. 7 illustrates one example of a RAM array and wrapper chain wherein the chain interfaces to a 4-bit slice of RAM array and employs an extra stage utilized for simultaneous load and unloading of the chain. It will be recognized that additional pipeline flip flops can be added in series with the chain flops to meet full rate timing of context save and restore data across the integrated circuit as desired. The circuit includes a RAM array 702, a test controller circuit 704 operatively coupled to the RAM array 702 using wrapper logic 710 and operative to test the RAM array during a test mode. Context control logic 706 is operatively coupled to the RAM array through the wrapper logic generally shown as 710 and is operative to store and/or restore context information from and to the RAM array 702 for storage in memory or retrieval from memory in response to detection of a change in context during non-test operation of the RAM array.

The integrated circuit, in normal bit-parallel operation, uses, for example, functional paths to read and write data to the RAM array 702. Functional write data (WRITE DATA IN), functional address (ADDR), functional write enable (WEN), and functional read enable (REN) are routed to RAM array 702 through data multiplexers 714, and address/control multiplexers 712 respectively, when in non-test mode (when the signal TESTEN from test control logic 704 is not asserted). Functional read data is taken from parallel DATA OUT signals from RAM array 702. When testing the RAM, the signal TESTEN is active so that logic 704 can supply address, write enable and read enable signals to the RAM array and causes test data to be read from the array on the TEST DATA OUT signals. Test data to be written is supplied serially on TEST DATA IN lines through multiplexer 713. When context switching, the context control logic 706 controls the context shift register 700 and associated multiplexers 712, 713, and 714 to, for example, restore context data in the shift register stage 700 in, for example, register bit S, while register bit 0 is used to output continuous context save data to save context data to memory to provide simultaneous restore and save capabilities if desired. For example, as shown, when saving context data, the DATA OUT path 716 between the RAM array 702 and shift register 700 allows the reading and saving of context data from the RAM array into the context shift register 700 and the context data to be saved is shifted out of the shift register 700 to context save data out signals to memory while the restoring of data for the RAM array from memory may be accomplished by the CTXEN signal controlling multiplexer 713 to load context restore data in register stage S. The LDW load word register 718 is used to buffer one 4-bit word at a time from the shift register 700 into the RAM array 702. The control logic 706 generates the requisite control information designated as 720 to control the various multiplexers and the CTXSW ADR address counter, to sequence, for example, addresses during the restore operation so that the restore data is loaded in the appropriate location of the RAM array 702 in a continuous serial stream. Note in this implementation that the shift register 700 and other associated wrapper logic are shared between test mode and context switching mode of operation.

Figure 8:
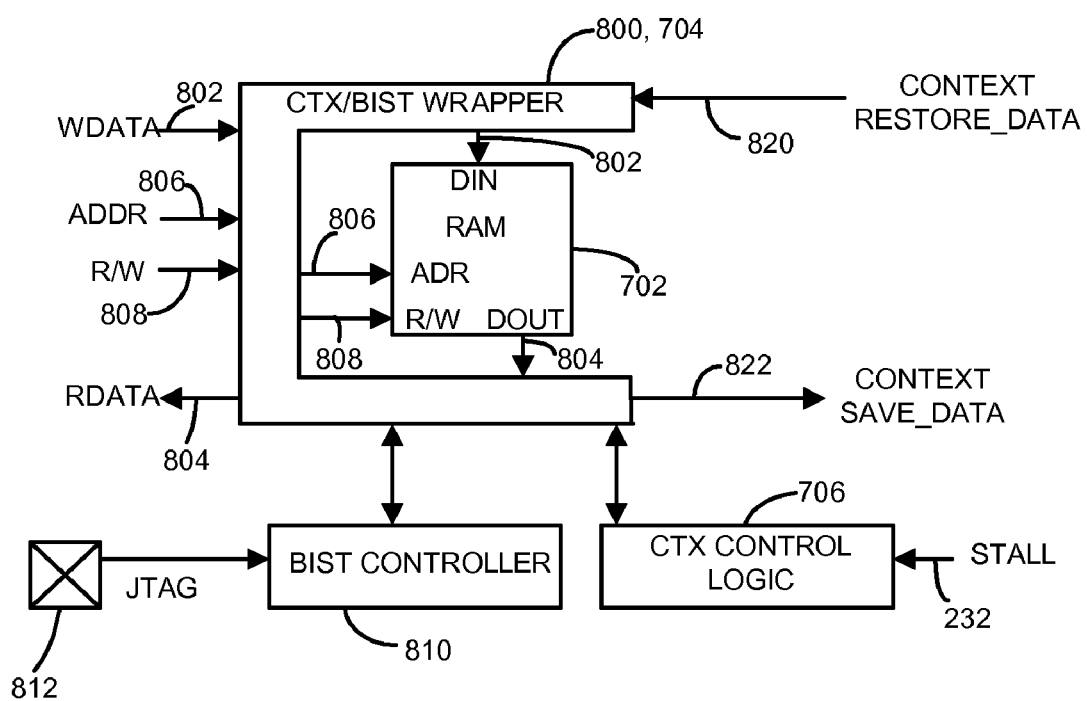
FIG. 8 is a block diagram illustrating one example of context switching structure applied to a random access memory element in accordance with one embodiment of the invention.

FIG. 8 is an alternative representation of the diagram shown in FIG. 7, which again shows a RAM array with a modified test wrapper that supports both built in self test and context save and restore functions. Like conventional BIST wrapper operation, the context/BIST wrapper 800 passes through the functional parallel data and control signals (write data 802, read data 804, address information 806 and read/write designation data 808) for the logic circuit directly to the RAM ports in functional mode, passing through the built in self test controller 810 as known in the art. In test mode, the wrapper 800 itself drives and observes the RAM ports under control of the BIST controller which can get its command from an interface pin 812. In test mode, the context/BIST wrapper 800 may generate its own test address and data locally or they may be shifted in and out serially (as illustrated in FIG. 7). However, unlike conventional BIST wrapper circuits, the context/BIST wrapper 800 supports both built in self test and context save and restore functions. In operation, the context/BIST wrapper 800 accepts one or more serial context data scan inputs from the context control logic 208 and memory controller 130. It may output the same number of save data scan outputs to the context control logic 208 and memory controller 130. The context/BIST wrapper 800 simultaneously reads/serializes and deserializes/writes the RAM data from the RAM array 702 at full functional clock speed. However, this process can be paused at any time using the stall signal 232. As noted with respect to FIG. 8, the context control logic 706 is used to manage the address and RAM read/write controls and the data serialization/deserialization in accordance with the width and depth of one or more RAM arrays. The save data and restore data lines 820 and 822 can be chained together with other flip flops or RAM wrappers to have the appropriate length. Alternatively, save and restore data lines 820 and 822 can be time multiplexed onto the main save and restore buses under control of switch controller 320.

Figure 9:
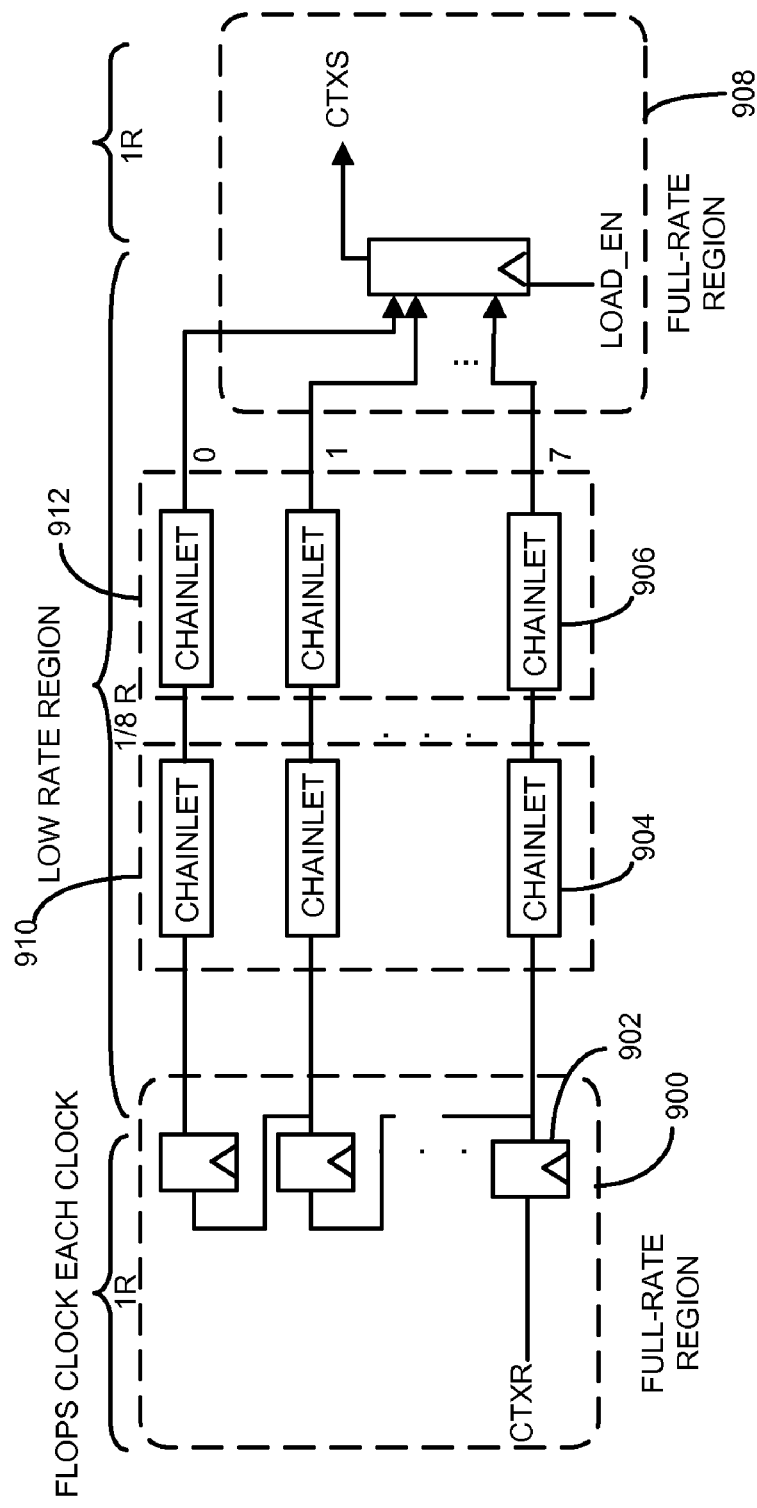
FIG. 9 is a block diagram illustrating one example of deserializing and serializing scan data for power savings in accordance with one embodiment of the invention.

FIG. 9 is a functional block diagram illustrating one example of a structure for deserializing and serializing scan data when performing context state restore. As shown, a deserializing circuit 900 receives the context restore data in a first latch element 902 and passes the restore data on to a plurality of scan chains 904 and 906 that are in series that make up a low rate region of the integrated circuit. The output of the scan chains 904 and 906 are then passed to a serializing circuit 908 when the data within the scan chains is to be saved or stored. As such, the deserializing circuit 900 may populate a plurality of parallel scan chains designated as 910 and 912 during the restore operation. These parallel test scan chains have an input that is operatively coupled to receive data from the deserializing circuit 900. The serializing circuit 908 is coupled to the output of each of the parallel test scan chains such as 904 and 906 to receive the output from each of the respective scan chains for storage in the context save mode.

Among other advantages, the above apparatus and methods can not only store and restore state information to accommodate context switching but also reuses on-chip test circuitry that is normally only used during test mode, during a non-test mode to store and/or restore context state information. This can result in, among other things, potential cost reductions and chip size reduction compared with other potential types of context switching techniques. Other advantages will be recognized by those of ordinary skill in the art.

The above detailed description and the examples described therein have been presented for the purposes of illustration and description only and not by limitation. For example, the operations described may be done in any suitable manner. The method steps may be done in any suitable order still providing the described operations and results. It is therefore contemplated that the present invention cover any and all modifications, variations or equivalents that fall within the spirit and scope of the basic underlying principles disclosed above and claimed herein.

What is claimed is:

1. A method for providing context switching in an integrated circuit comprising:
   detecting a request for a change in context for at least one of a plurality of logic circuits in the integrated circuit;
   controlling at least one test scan circuit and at least one RAM wrapper associated with the at least one of the logic circuits to at least one of: save and restore context state information of the at least one of the logic circuits in response to the request for a change in context; and wherein context state information comprises data stored in flip flops and in RAM elements, said RAM elements being operated in a functional mode and wherein at least one RAM element corresponds to said RAM wrapper; and
   storing said context state information in a context state information storage memory.

2. The method of claim 1 wherein the plurality of logic circuits comprises at least one memory client.

3. The method of claim 2 wherein controlling the test scan circuit comprises selecting at least one flop scan chain of the test scan circuit to at least one of: output context state information for transfer to memory for storage and receive stored context state information from memory.

4. The method of claim 2 including at least one of: compressing the context state information prior to storing the context state information in the memory and decompressing compressed context state information prior to restoring the context state information using the test scan circuit.

5. The method of claim 1 wherein controlling the test scan circuit comprises controlling switching logic that is operatively coupled to the logic circuits to store and restore context state information of the logic circuits.

6. The method of claim 1 wherein saving a first set of context state information is performed simultaneously with restoring a second set of context state information.

7. The method of claim 1 including stalling the save and/or restore of the context state information in response to a memory controller loading level.

8. The method of claim 1 wherein the test scan circuit comprises memory wrapper logic and wherein the memory wrapper logic is used to save and restore one or more serial streams of state information.

9. The method of claim 1 including performing error detection and correction on the context state information to be stored in memory.

10. An integrated circuit comprising:
    at least one test scan circuit and at least one RAM wrapper operative to use test data during a test mode and operatively coupled to use non-test data during normal operation;
    context control logic operative to control the test scan circuit to at least one of: store and restore context state information of the test scan circuit in response to detection of a request for a change in context during normal operation;
    context state information storage memory operatively coupled to said context control logic and said at least one test scan circuit and operative to store from, and restore to, said at least one test scan circuit, said context state information; and
    wherein the test scan circuit comprises a plurality of scan chains wherein at least one of the scan chains comprises: latch elements and at least one random access memory array and wherein the context control logic is operative to select inputs to each of the plurality of scan chains to facilitate restoring of the context state information from said context state information storage memory during non-test operation.

11. The circuit of claim 10 wherein the test scan circuit comprises at least one scan chain comprising a switching structure operatively coupled to an input latch element of the scan chain and operatively controllable to select as input to the input latch element at least one of: input data from a logic circuit, test data and restore context state information.

12. The circuit of claim 11 wherein the scan chain comprises an output latch element having an output operatively coupled to the context control logic to provide context state information for storage in response to a context state change.

13. The circuit of claim 10 including clock switching logic and wherein the context control logic is operative to control clocking of the logic circuit during non-test operation to at least one of save and restore context state information.

14. The circuit of claim 10 comprising memory control logic operatively coupled to the context control logic and operative to provide parallel store and retrieve operations for a memory client and save and restore of context state information via the context control logic.

15. The circuit of claim 10 wherein the plurality of logic circuits comprise logic circuits in a graphics engine.

16. The circuit of claim 10 comprising memory control logic operatively coupled to the context control logic and coupleable to memory and operative to facilitate storage and retrieval of the context state information to and from the memory.

17. The circuit of claim 10 wherein the plurality of logic circuits comprise at least one memory client.

18. The circuit of claim 10 wherein the at least one test scan circuit is operative to use test data during a test mode and operatively coupled to use data during normal operation comprises a context state information restore circuit comprising:
    a deserializing circuit;
    parallel test scan chains each having an input operatively coupled to receive data from the deserializing circuit; and
    a serializing circuit, operatively coupled to an output of each of the parallel test scan chains.

19. An integrated circuit comprising:
    at least one test scan circuit associated with at least one logic circuit, said at least one test scan circuit comprising parallel scan chains of at least latch elements, at least one RAM wrapper and at least one random access memory array;
    context control logic operative to control the test scan circuit to at least one of: save and restore context state information of the at least one logic circuit in response to the detection of a request for a change in context during non-test operation of the at least one logic circuit; and
    context state information storage memory operatively coupled to said context control logic and said at least one test scan circuit and operative to store from, and restore to, said at least one test scan circuit, said context state information.

20. The integrated circuit of claim 19 comprising a plurality of serially coupled RAM elements each having associated test scan circuits and wherein the context control logic is operative to shift context information from one RAM element to the other RAM element during normal operation and multiplexing saved context in a data path to a memory controller.

21. The integrated circuit of claim 19 comprising a plurality of RAM elements each having associated test scan circuits and wherein the context control logic is operative to shift context information from one RAM element during one set of clock cycles and from another RAM element during another set of clock cycles.

22. An integrated circuit comprising:
   at least one random access memory array;
   at least one test scan circuit operatively coupled to the RAM array and operative to test the RAM array during a test mode;
   at least one RAM wrapper operative to use test data during a test mode and operatively coupled to use non-test data during normal operation;
   context control logic operative to control the test scan circuit to at least one of: store and restore context information from and to the RAM array, in response to the detection of a change in context during non-test operation of the RAM array; and
   context state information storage memory operatively coupled to said context control logic and said at least one test scan circuit and said at least on RAM array and operative to store from, and restore to, said at least one test scan circuit and said RAM array, said context state information.

23. The integrated circuit of claim 22 comprising at least one logic circuit operatively coupled to the RAM array and operative to use the RAM array to store data during normal operation of the logic circuit.

* * * * *